(12) United States Patent
Punniyamurthy et al.

(10) Patent No.: US 12,050,531 B2
(45) Date of Patent: Jul. 30, 2024

(54) DATA COMPRESSION AND DECOMPRESSION FOR PROCESSING IN MEMORY

(71) Applicant: Advanced Micro Devices, Inc., Santa Clara, CA (US)

(72) Inventors: Kishore Punniyamurthy, Austin, TX (US); Jagadish B Kotra, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/952,697

(22) Filed: Sep. 26, 2022

(65) Prior Publication Data

US 2024/0104015 A1    Mar. 28, 2024

(51) Int. Cl.
*G06F 12/02* (2006.01)

(52) U.S. Cl.
CPC .. *G06F 12/0292* (2013.01); *G06F 2212/1024* (2013.01); *G06F 2212/401* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17;
(Continued)

(56) References Cited

U.S. PATENT DOCUMENTS

| 6,553,465 B1 | 4/2003 | Takusagawa |
| 6,879,266 B1 * | 4/2005 | Dye .................... H03M 7/40 |
| | | 711/170 |

(Continued)

OTHER PUBLICATIONS

Definition of "dedicated"; Merriam-Webster Dictionary; May 8, 2013; retrieved from https://web.archive.org/web/20130508204153/https://www.merriam-webster.com/dictionary/dedicated on Dec. 19, 2023 (Year: 2013).*

(Continued)

*Primary Examiner* — Daniel C. Chappell
(74) *Attorney, Agent, or Firm* — FIG. 1 Patents (57) ABSTRACT

In accordance with the described techniques for data compression and decompression for processing in memory, a page address is received by a processing in memory component that maps to a first location in memory where data of a page is maintained. The data of the page is compressed by the processing in memory component. Further, compressed data of the page is written by the processing in memory component to a compressed block device responsive to the compressed data satisfying one or more compressibility criteria. The compressed block device is a portion of the memory dedicated to storing data in a compressed form.

20 Claims, 4 Drawing Sheets

(58) Field of Classification Search
CPC ........... G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | |
|---|---|---|---|
| 6,944,746 | B2 | 9/2005 | So |
| 7,047,393 | B2* | 5/2006 | Paver .................. G06F 9/30112 712/E9.046 |
| 7,188,227 | B2* | 3/2007 | Luick ...................... G06F 12/04 711/171 |
| 8,359,462 | B1 | 1/2013 | Khan et al. |
| 9,600,317 | B2* | 3/2017 | Guo ..................... G06F 9/45558 |
| 10,042,563 | B2* | 8/2018 | Nanduri ................. G06F 3/061 |
| 10,061,588 | B2 | 8/2018 | Gschwind et al. |
| 11,116,448 | B1* | 9/2021 | Trapero Martin ... A61B 5/0816 |
| 11,594,274 | B2 | 2/2023 | Murphy et al. |
| 11,625,249 | B2 | 4/2023 | Kotra et al. |
| 11,663,008 | B2 | 5/2023 | Lee et al. |
| 11,868,777 | B2 | 1/2024 | Kalamatianos et al. |
| 11,886,713 | B2* | 1/2024 | Kimoto ................. G06F 3/0655 |
| 2008/0046692 | A1 | 2/2008 | Michalak et al. |
| 2008/0244185 | A1 | 10/2008 | O'Krafka et al. |
| 2013/0086367 | A1 | 4/2013 | Gschwind et al. |
| 2014/0281405 | A1 | 9/2014 | Streett et al. |
| 2015/0149746 | A1* | 5/2015 | Suga ....................... G06F 12/00 712/221 |
| 2015/0301946 | A1* | 10/2015 | Guo ..................... G06F 9/45558 711/6 |
| 2016/0155491 | A1 | 6/2016 | Roberts et al. |
| 2017/0060588 | A1* | 3/2017 | Choi ....................... G06F 15/80 |
| 2017/0262369 | A1 | 9/2017 | Murphy |
| 2017/0269865 | A1* | 9/2017 | Willcock .............. G06F 3/0673 |
| 2017/0344480 | A1 | 11/2017 | Beard et al. |
| 2018/0089081 | A1 | 3/2018 | Ramalingam |
| 2018/0188961 | A1* | 7/2018 | Venkatesh ............. G06F 3/0637 |
| 2018/0336035 | A1* | 11/2018 | Choi ........................ G06F 9/35 |
| 2020/0192757 | A1 | 6/2020 | Qin et al. |
| 2020/0218540 | A1 | 7/2020 | Kesiraju et al. |
| 2021/0271680 | A1 | 9/2021 | Lee et al. |
| 2022/0076717 | A1 | 3/2022 | Mathew et al. |
| 2022/0188117 | A1* | 6/2022 | Kalamatianos ..... G06F 9/30098 |
| 2022/0188233 | A1* | 6/2022 | Kalamatianos ..... G06F 12/0815 |
| 2022/0206817 | A1* | 6/2022 | Kotra .................... G06F 9/3887 |
| 2022/0206855 | A1* | 6/2022 | Challapalle .......... G06F 9/30076 |
| 2022/0398032 | A1* | 12/2022 | Jeong .................... G06F 3/0655 |
| 2023/0010801 | A1* | 1/2023 | Pillai ....................... G06F 12/04 |
| 2023/0244492 | A1 | 8/2023 | Kotra et al. |
| 2024/0126552 | A1 | 4/2024 | Kalamatianos et al. |

OTHER PUBLICATIONS

G. Yuan, X. Ma, S. Lin, Z. Li, J. Deng and C. Ding, "A DNN Compression Framework for SOT-MRAM-based Processing-In-Memory Engine," 2020 IEEE 33rd International System-on-Chip Conference (SOCC), Las Vegas, NV, USA, 2020, pp. 37-42, doi: 10.1109/SOCC49529.2020.9524757. (Year: 2020).*
B. J. Jasionowski, M. K. Lay and M. Margala, "A Processor-In-Memory Architecture for Multimedia Compression, " in IEEE Transactions on Very Large Scale Integration (VLSI) Systems, vol. 15, No. 4, pp. 478-483, Apr. 2007, doi: 10.1109/TVLSI.2007. 893672. (Year: 2007).*
C. Chu et al., "PIM-Prune: Fine-Grain DCNN Pruning for Crossbar-Based Process-In-Memory Architecture," 2020 57th ACM/IEEE Design Automation Conference (DAC), San Francisco, CA, USA, 2020, pp. 1-6, doi: 10.1109/DAC18072.2020.9218523. (Year: 2020).*
Processing In Memory: Chips to Petaflops; Kogge et al.; In Workshop on Mixing Logic and DRAM: Chips that Compute and Remember at ISCA '97; 1997; retrieved from http://www.cs.ucf.edu/courses/cda5106/summer02/papers/kogge97PIM.pdf on Feb. 25, 2019 (Year: 1997).*
U.S. Appl. No. 17/123,270, "Notice of Allowance", U.S. Appl. No. 17/123,270, filed Sep. 7, 2023, 7 pages.
"HPCA 2021", The 27th IEEE International Symposium on High-Performance Computer Architecture (HPCA-27), Seoul, South Korea [retrieved Sep. 15, 2022]. Retrieved from the Internet <https://hpca-conf.org/2021/keynotes/>., Mar. 2021, 3 Pages.
"LZW (Lempel-Ziv-Welch) Compression technique", GeeksforGeeks [retrieved Jul. 21, 2022]. Retrieved from the Internet <https://www.geeksforgeeks.org/lzw-lempel-ziv-welch-compression-technique/>., Nov. 2021, 11 Pages.
U.S. Appl. No. 17/123,270, "Non-Final Office Action", U.S. Appl. No. 17/123,270, filed Aug. 4, 2021, 14 pages.
U.S. Appl. No. 17/123,270, "Notice of Allowance", U.S. Appl. No. 17/123,270, filed Nov. 10, 2022, 7 pages.
U.S. Appl. No. 17/137,140, "Final Office Action", U.S. Appl. No. 17/137,140, filed Aug. 15, 2022, 8 pages.
U.S. Appl. No. 17/137,140 , "Non-Final Office Action", U.S. Appl. No. 17/137,140, filed Mar. 9, 2022, 8 pages.
Gupta, Nitin , "Compcache: In-Memory Compressed Swapping", LWN.net [retrieved Jul. 21, 2022]. Retrieved from the Internet <https://lwn.net/Articles/334649/>., May 26, 2009, 11 Pages.
Kumar, Pranith , et al., "Parallel Hash Table Design for NDP Systems", MEMSYS 2020: The International Symposium on Memory Systems [retrieved Jul. 21, 2022]. Retrieved from the Internet <https://doi.org/10.1145/3422575.3422776>., Mar. 21, 2021, 7 Pages.
Ondich, Jeff , "LZW Compression and Decompression", Department of Mathematics and Computer Science, Carleton College [retrieved Jul. 21, 2022]. Retrieved from the Internet <https://cs.carleton.edu/faculty/jondich/courses/cs337_w02/assignments/lzw.html>., 2 Pages.
U.S. Appl. No. 17/137,140 , "Notice of Allowance", U.S. Appl. No. 17/137,140, filed Dec. 8, 2022, 8 pages.
U.S. Appl. No. 17/136,767 , "Non-Final Office Action", U.S. Appl. No. 17/136,767, Dec. 20, 2023, 20 pages.
Ahn, Junwhan , et al., "PIM-enabled instructions: a low-overhead, locality-aware processing-in-memory architecture", ACM SIGARCH Computer Architecture News, vol. 43, No. 3S [retrieved Jan. 12, 2024]. Retrieved from the Internet <https://doi.org/10.1145/2872887.2750385>, Jun. 13, 2015, 13 pages.
Byoung-Hak, Kim , et al., "Exploration of a PIM Design Configuration for Energy-Efficient Task Offloading", 2019 IEEE International Symposium on Circuits and Systems (ISCAS) [retrieved Jan. 12, 2024]. Retrieved from the Internet <https://doi.org/10.1109/ISCAS.2019.8702339>, May 2019, 4 pages.
Ghose, S , et al., "Processing-in-memory: A workload-driven perspective", IBM Journal of Research and Development, vol. 63, No. 6 [retrieved Jan. 12, 2024]. Retrieved from the Internet <https://doi.org/10.1147/JRD.2019.2934048> 1 of 2, Aug. 8, 2019, 19 pages.
Ghose, S , et al., "Processing-in-memory: A workload-driven perspective", IBM Journal of Research and Development, vol. 63, No. 6 [retrieved Jan. 12, 2024]. Retrieved from the Internet <https://doi.org/10.1147/JRD.2019.2934048> 2 of 2, Aug. 8, 2019, 19 pages.
Lee, Won Jun , et al., "Design of Processing—"Inside"—Memory Optimized for DRAM Behaviors", IEEE Access, vol. 7 [retrieved Jan. 12, 2024]. Retrieved from the Internet <https://doi.org/10.1109/ACCESS.2019.2924240>, Jun. 21, 2019, 16 pages.
Pattnaik, Ashutosh , et al., "Scheduling techniques for GPU architectures with processing-in-memory capabilities", PACT '16: Proceedings of the 2016 International Conference on Parallel Archi- (56) References Cited

OTHER PUBLICATIONS tectures and Compilation [retrieved Oct. 16, 2022]. Retrieved from the Internet <https://research.ece.cmu.edu/safari/pubs/scheduling-for-GPU-processing-in-memory_pact16.pdf>., Sep. 11, 2016, 14 Pages.

U.S. Appl. No. 17/473,242, "Non-Final Office Action", U.S. Appl. No. 17/473,242, Mar. 7, 2024, 16 pages.

U.S. Appl. No. 17/136,767, "Notice of Allowance", U.S. Appl. No. 17/136,767, Apr. 30, 2024, 18 pages.

Nai, Lifeng, et al., "GraphPIM: Enabling Instruction-Level PIM Offloading in Graph Computing Frameworks", 2017 IEEE International Symposium on High Performance Computer Architecture (HPCA), Feb. 2017, 12 pages.

* cited by examiner

DATA COMPRESSION AND DECOMPRESSION FOR PROCESSING IN MEMORY

BACKGROUND

Processing in memory (PIM) architectures move processing of memory-intensive computations to memory. This contrasts with standard computer architectures which communicate data back and forth between a memory and a remote processing unit. In terms of data communication pathways, remote processing units of conventional computer architectures are further away from memory than PIM components. As a result, these conventional computer architectures suffer from increased data transfer latency, reduced data communication bandwidth, and increased data communication energy, particularly when the volume of data transferred between the memory and the remote processing unit is large. Thus, PIM architectures enable increased computer performance while reducing data transfer latency as compared to conventional computer architectures that implement remote processing hardware. Moreover, by implementing various computation tasks at a PIM component rather than a remote processing unit, computational resources that would otherwise be consumed by the remote processing unit are conserved.

DETAILED DESCRIPTION

Overview

A memory architecture includes a processing unit communicatively coupled to a memory and a secondary storage. Oftentimes, the memory does not include sufficient storage to maintain all of the data that is utilized by a program executing on the processing unit. Therefore, pages of data are transferred from the memory to the secondary storage via the processing unit. However, due to the length of the communication pathway between memory and the secondary storage, communicating data back and forth between the memory and the secondary storage increases data transfer latency and data transfer energy while reducing data communication bandwidth. To alleviate these issues, compression and decompression techniques are implemented to compress pages of data and store the compressed data in the memory rather than the secondary storage.

Conventional techniques for data compression and data decompression, however, are implemented by the processing unit. These conventional techniques, for instance, involve communicating the data of the page from the memory to the processing unit, compressing or decompressing the data of the page using the processing unit, and communicating the compressed data or the decompressed data back to the memory. By communicating data back and forth between the processing unit and the memory, these conventional techniques consume a significant amount of data communication bandwidth and data communication energy. Furthermore, the processing unit consumes significant computational resources to compress and decompress the data.

To overcome these drawbacks of conventional techniques, data compression and decompression for processing in memory are described. In accordance with the described techniques, a PIM component is embedded in a memory module to enable data to be obtained from the memory and compressed or decompressed entirely within the memory module. Further, a compressed block device is maintained in the memory, which is a portion of the memory dedicated to storing data in a compressed form. The processing unit communicates a page address to the PIM component which maps to a location in the memory where data of a page is maintained. Moreover, the processing unit communicates compression logic to the PIM component as a plurality of PIM commands instructing the PIM component to perform various compression-related tasks. As part of the compression logic, the PIM component reads the data of the page from the location in memory indicated by the page address and compress the data.

Further, the PIM component compares the compressed data of the page to compressibility criteria maintained in a compressibility check register of the PIM component. In one example, the compressibility criteria specify a maximum size for the compressed data of the page to be stored in the compressed block device rather than the secondary storage. In implementations, the processing unit also communicates a compressed page address to the PIM component which maps to a location in the compressed block device where the compressed data of the page is to be stored. In response to the compressed data satisfying the compressibility criteria, the PIM component writes the compressed data to the location in the compressed block device indicated by the compressed page address. In response to the compressed data not satisfying the compressibility criteria, the processing unit transfers the uncompressed data of the page to the secondary storage.

When the compressed data of the page is subsequently accessed, the PIM component is configured to decompress the compressed data. To do so, the PIM component receives an address which maps to a location in the compressed block device where the compressed data is maintained, as well as a decompressed page address which maps to a location in the memory where the decompressed data of the page is to be written. Moreover, the processing unit communicates decompression logic to the PIM component as a plurality of PIM commands instructing the PIM component to perform various decompression-related tasks. As part of the decompression logic, the PIM component reads the data from the location in the compressed block device indicated by the address. Further, the PIM component decompresses the data and writes the decompressed data to the location in the memory indicated by the decompressed page address.

By implementing the compression logic and the decompression logic at the PIM component rather than the processing unit, the described techniques reduce data movement, thereby reducing data transfer latency and data transfer energy, and increasing data communication bandwidth. Further, the described techniques conserve computational resource usage at the processing unit. By doing so, the described techniques improve computational performance over conventional techniques.

In some aspects, the described techniques herein relate to a method, comprising receiving, by a processing in memory component, a page address that maps to a first location in memory where data of a page is maintained; compressing, by the processing in memory component, the data of the page; and writing, by the processing in memory component, compressed data of the page to a compressed block device responsive to the compressed data satisfying one or more compressibility criteria, the compressed block device comprising a portion of the memory dedicated to storing data in a compressed form.

In some aspects, the described techniques herein relate to a method, further comprising writing, by the processing in memory component and to a dedicated location in the memory, a compression result indicating that the compressed data of the page satisfies the one or more compressibility criteria and is stored in the compressed block device.

In some aspects, the described techniques herein relate to a method, further comprising: reading, by a processing unit communicatively coupled to the memory, the compression result; and updating, by the processing unit, an entry in a page table maintained in the memory to indicate that the data of the page is stored in the compressed block device.

In some aspects, the described techniques herein relate to a method, further comprising: reading, by a processing unit communicatively coupled to the memory, the compression result; and updating, by the processing unit, an entry corresponding to the page in an index table maintained in the memory, the entry updated to indicate that the data of the page maps to a second location in the compressed block device where the compressed data of the page is maintained.

In some aspects, the described techniques herein relate to a method, further comprising writing, by the processing in memory component and to a dedicated location in memory, a compression result responsive to the compressed data not satisfying the one or more compressibility criteria, the compression result indicating that the compressed data of the page does not satisfy the one or more compressibility criteria and the data of the page is stored in an uncompressed form at the first location in the memory.

In some aspects, the described techniques herein relate to a method, further comprising: reading, by a processing unit communicatively coupled to the memory, the compression result; and transferring, by the processing unit, the data of the page in the uncompressed form to a secondary storage device.

In some aspects, the described techniques herein relate to a method, wherein the compressing the data of the page is performed by multiple processing in memory components configured as single instruction, multiple data (SIMD) in-memory processors, each of the multiple processing in memory components compressing a portion of the data in parallel In some aspects, the described techniques herein relate to a method, wherein: the processing in memory component is included in a first memory channel and a first portion of the data of the page is mapped to a location in the memory that is also included in the first memory channel, the compressing the data of the page including compressing, by the processing in memory component, the first portion of the data, and an additional processing in memory component is included in a second memory channel and a second portion of the data of the page is mapped to a location in the memory that is also included in the second memory channel, the compressing the data of the page including compressing, by the additional processing in memory component, the second portion of the data.

In some aspects, the described techniques herein relate to a method, wherein the writing the compressed data of the page includes: writing, by the processing in memory component, a first compressed portion of the data to a first portion of the compressed block device included in the first memory channel, and writing, by the additional processing in memory component, a second compressed portion of the data of the page to a second portion of the compressed block device included in the second memory channel.

In some aspects, the described techniques herein relate to a method comprising: receiving, by a processing in memory component, an index table address that maps to a first location in a compressed block device where compressed data of a page is maintained, the compressed block device comprising a portion of a memory dedicated to storing data in a compressed form; decompressing, by the processing in memory component, the compressed data of the page; receiving, by the processing in memory component, an indication of a second location in the memory; and writing, by the processing in memory component, decompressed data of the page to the second location in the memory.

In some aspects, the described techniques herein relate to a method, further comprising writing, by the processing in memory component and to a dedicated location in the memory, a decompression result indicating that the compressed data of the page was successfully decompressed and the decompressed data of the page is maintained in the memory at the second location.

In some aspects, the described techniques herein relate to a method, further comprising: reading, by a processing unit communicatively coupled to the memory, the decompression result; updating, by the processing unit, an entry in a page table maintained in the memory to indicate that the data of the page maps to the second location in the memory where the decompressed data of the page is stored; and updating, by the processing unit, the entry in the page table to indicate that the data of the page is no longer stored in the compressed block device.

In some aspects, the described techniques herein relate to a system comprising: a memory; a compressed block device comprising a portion of the memory dedicated to storing data in a compressed form; a processing in memory component; and a processing unit communicatively coupled to the memory, the processing unit configured to communicate commands to the memory, the commands including a page address which maps to a first location in the memory where data of a page is maintained, the commands instructing the processing in memory component to compress the data of the page and write compressed data to a second location in the compressed block device based on the compressed data satisfying one or more compressibility criteria.

In some aspects, the described techniques herein relate to a system, wherein the commands instruct the processing in memory component to write a compression result to a dedicated location in the memory, the compression result indicating that the compressed data of the page satisfies the one or more compressibility criteria and is stored in the compressed block device.

In some aspects, the described techniques herein relate to a system, wherein the processing unit is further configured to: read the compression result; and update an entry corresponding to the page in an index table maintained in the memory, the entry updated to indicate that the data of the page maps to the second location in the compressed block device where the compressed data of the page is maintained.

In some aspects, the described techniques herein relate to a system, wherein the processing unit is further configured to: offload compression of the data of the page to the processing in memory component via the commands in response to the first location and the second location being included in a same memory channel; and compress the data of the page in response to the first location and the second location being included in different memory channels.

In some aspects, the described techniques herein relate to a system, wherein the processing unit is further configured to communicate additional commands to the memory, the additional commands including an index table address of the page which maps to the second location in the compressed block device where the compressed data is maintained and an address which identifies a third location in the memory, the additional commands instructing the processing in memory component to decompress the compressed data and write decompressed data to the third location in the memory.

In some aspects, the described techniques herein relate to a system, wherein the additional commands instruct the processing in memory component to write a decompression result to a dedicated location in memory, the decompression result indicating that the compressed data of the page was successfully decompressed and the decompressed data of the page is maintained in the memory at the third location.

In some aspects, the described techniques herein relate to a system, wherein the processing unit is further configured to: read the decompression result; and update an entry in a page table maintained in the memory to indicate that the page address maps to the third location in the memory where the decompressed data of the page is stored.

In some aspects, the described techniques herein relate to a system, wherein the processing unit is further configured to: offload decompression of the compressed data of the page to the processing in memory component via the additional commands in response to the second location and the third location being included in a same memory channel; and decompress the compressed data of the page in response to the second location and the third location being included in different memory channels.

Figure 1:
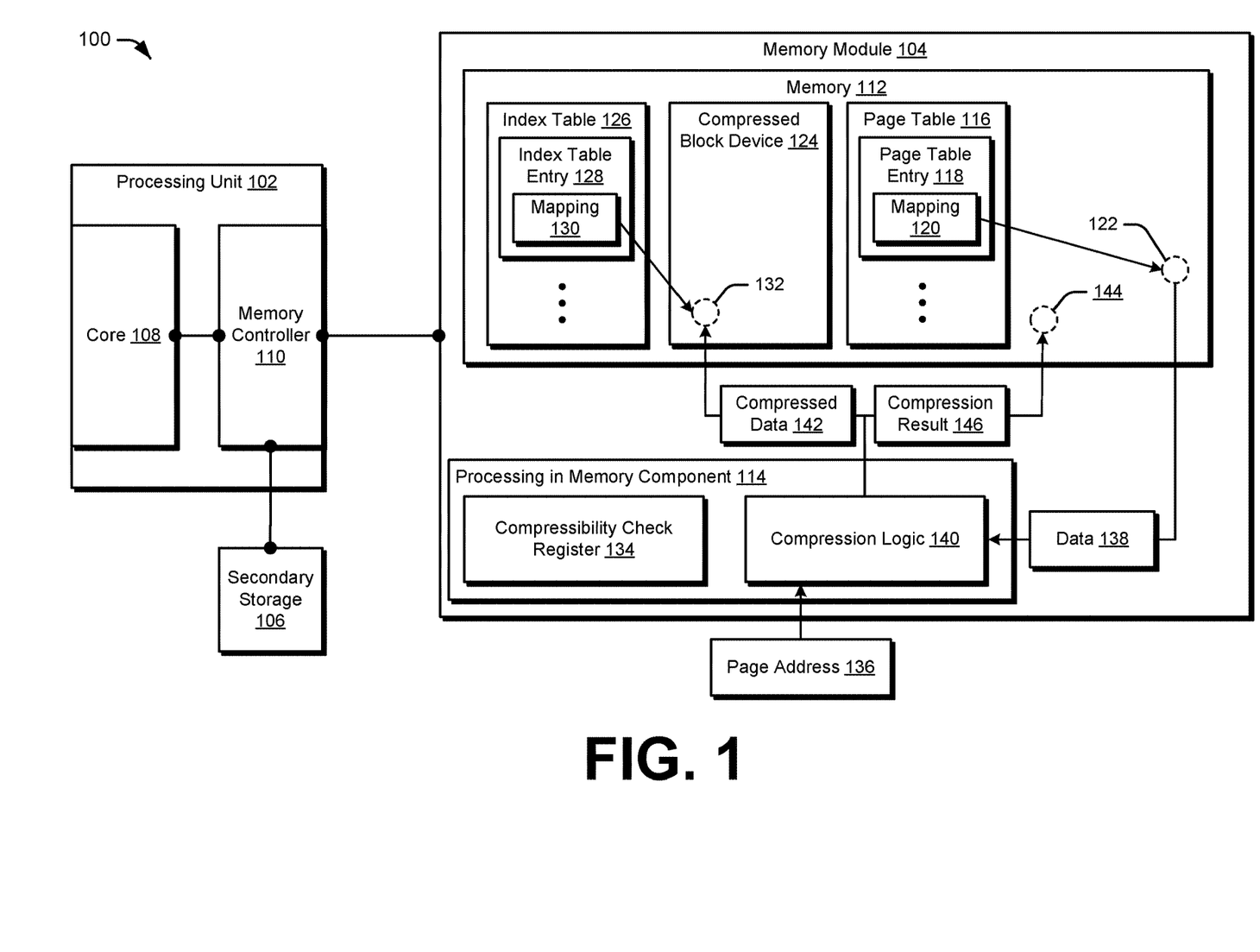
FIG. 1 is a block diagram of a non-limiting example system having a processing unit coupled to a memory module and a secondary storage and having a processing in memory component embedded in the memory module to implement data compression in accordance with the described techniques.

FIG. 1 is a block diagram of a non-limiting example system 100 having a processing unit coupled to a memory module and a secondary storage and having a processing in memory component embedded in the memory module to implement data compression in accordance with the described techniques. In particular, the system 100 includes a processing unit 102, a memory module 104, and a secondary storage 106. The processing unit 102 includes a core 108 and a memory controller 110. The memory module 104 includes a memory 112 and a processing in memory (PIM) component 114.

In accordance with the described techniques, the processing unit 102 and the memory module 104 are coupled to one another via a wired or wireless connection. The core 108 and the memory controller 110 are also coupled to one another via one or more wired or wireless connections. Example wired connections include, but are not limited to, buses (e.g., a data bus), interconnects, traces, and planes. Examples of devices in which the system 100 is implemented include, but are not limited to, servers, personal computers, laptops, desktops, game consoles, set top boxes, tablets, smartphones, mobile devices, virtual and/or augmented reality devices, wearables, medical devices, systems on chips, and other computing devices or systems.

The processing unit 102 is an electronic circuit that performs various operations on and/or using data in the memory 112. Examples of the processing unit 102 include, but are not limited to, a central processing unit (CPU), a graphics processing unit (GPU), a field programmable gate array (FPGA), an accelerated processing unit (APU), and a digital signal processor (DSP). The core 108 is a processing unit that reads and executes commands (e.g., of a program), examples of which include to add, to move, to compress data, and to decompress data. Although one core 108 is depicted in the example system 100, in variations, the processing unit 102 includes more than one core 108, e.g., the processing unit 102 is a multi-core processor.

In one or more implementations, the memory module 104 is a circuit board (e.g., a printed circuit board), on which the memory 112 is mounted and includes the PIM component 114. In variations, one or more integrated circuits of the memory 112 are mounted on the circuit board of the memory module 104, and the memory module 104 includes multiple PIM components 114. Examples of the memory module 104 include, but are not limited to, single in-line memory module (SIMM), dual in-line memory module (DIMM), high-bandwidth memory (HBM), and TransFlash memory module.

The memory 112 is a device or system that is used to store information, such as for immediate use in a device, e.g., by the core 108 of the processing unit 102 and/or by the PIM component 114. In one or more implementations, the memory 112 corresponds to semiconductor memory where data is stored within memory cells on one or more integrated circuits. In at least one example, the memory 112 corresponds to or includes volatile memory, examples of which include random-access memory (RAM), dynamic random access memory (DRAM), synchronous dynamic random access memory (SDRAM), and static random-access memory (SRAM). Alternatively or in addition, the memory 112 corresponds to or includes non-volatile memory, examples of which include flash memory, read-only memory (ROM), programmable read-only memory (PROM), erasable programmable read-only memory (EPROM), and electronically erasable programmable read-only memory (EEPROM). Thus, the memory 112 is configurable in a variety of ways that support data compression and decompression for processing in memory without departing from the spirit or scope of the described techniques.

In one or more implementations, a page table 116 is maintained in the memory 112. Generally, the page table 116 is a data structure which maps virtual page addresses (e.g., which are utilized by an operating system and/or hypervisor to run a program on the core 108 of the processing unit 102) to physical page addresses, e.g., which represent a location in memory where data of a page is maintained. The page table 116 includes a plurality of page table entries 118, each of which represent one page and include a mapping 120. The mapping 120 correlates a virtual page address to a corresponding physical page address. In the illustrated example, for instance, the page table entry 118 includes a mapping 120 which identifies a location 122 in the memory 112 where data of the page is maintained.

Generally, the core 108 of the processing unit 102 communicates with the memory module 104 to translate the virtual page address to the physical page address using the page table 116 in order to access data of the page. Upon identifying the physical page address corresponding to the virtual page address, the processing unit 102 can issue commands to the memory module 104 using the physical page address to obtain the data of the page from the memory 112 for further processing, e.g., by the core 108 of the processing unit 102 or by the PIM component 114.

The memory controller 110 is a digital circuit that manages the flow of data to and from the memory 112 and the secondary storage 106. By way of example, the memory controller 110 includes logic to read and write to the memory 112, as well as logic to read and write to the secondary storage 106. In one or more implementations, the memory controller 110 also includes logic to read and write to registers (e.g., temporary data storage) maintained by the PIM component 114, and to interface with the PIM component 114, e.g., to provide commands to the PIM component 114 for processing by the PIM component 114. The memory controller 110 also interfaces with the core 108. For instance, the memory controller 110 receives commands from the core 108 which involve accessing the secondary storage 106, memory 112, and/or the PIM component 114 and provides data to the core 108, e.g., for processing by the core 108. In one or more implementations, the memory controller 110 is communicatively located between the core 108, the memory module 104, and the secondary storage 106, and the memory controller 110 interfaces with the core 108, the memory module 104, and the secondary storage 106.

Broadly, the PIM component 114 corresponds to or includes one or more in-memory processors, e.g., embedded within the memory module 104. The processing unit 102 is configured to offload memory bound computations to the one or more in-memory processors of the PIM component 114. To do so, the core 108 generates PIM commands and transmits the PIM commands, via the memory controller 110, to the memory module 104. The PIM component 114 receives the PIM commands and processes the PIM commands using the one or more in-memory processors and utilizing data stored in the memory 112. Example PIM commands include: (1) PIM-load commands which instruct the PIM component 114 to read data from a specified location in the memory 112 and store the data in registers maintained by the PIM component 114, (2) PIM-operate commands which instruct the PIM component 114 to perform specified operations (e.g., add, subtract, compress, decompress) on the data that is residing in the registers, and (3) PIM-store commands which instruct the PIM component 114 to write the data residing in the registers to a specified location in the memory 112.

As mentioned above, the memory controller 110 is also configured to read and write directly to the registers of the PIM component 114. To do so, the memory controller 110 receives PIM commands from the core, examples of which include: (4) PIM-read commands which instruct the memory controller 110 to read data directly from the registers of the PIM component 114, and (5) PIM-write commands which instruct the memory controller 110 to write data (e.g., processed by the core 108) directly to the registers of the PIM component 114.

Processing in memory using in-memory processors contrasts with standard computer architectures which obtain data from memory, communicate the data to the core 108 of the processing unit 102, and process the data using the core 108 rather than the PIM component 114. In various scenarios, the data produced by the core 108 as a result of processing the obtained data is written back to the memory 112, which involves communicating the produced data over the pathway from the core 108 to the memory 112. In terms of data communication pathways, the core 108 is further away from the memory 112 than the PIM component 114. As a result, these standard computer architectures suffer from increased data transfer latency, reduced data communication bandwidth, and increased data communication energy, particularly when the volume of data transferred between the memory and the processing unit 102 is large, which can also decrease overall computer performance. Thus, the PIM component 114 enables increased computer performance while reducing data transfer energy as compared to standard computer architectures which use the core 108 of the processing unit 102 to process data. Moreover, by implementing various computation tasks at a PIM component rather than a remote processing unit, computational resources that would otherwise be consumed by the remote processing unit are conserved. Further, the PIM component 114 alleviates memory performance and energy bottlenecks by moving one or more memory-intensive computations closer to the memory 112.

The secondary storage 106 is a device or system that is used to store information, such as for use in a device, e.g., by the core 108 of the processing unit 102 and/or by the PIM component 114. In at least one example, the secondary storage 106 corresponds to or includes magnetic storage device(s), such as hard-disk drives. Alternatively or additionally, the secondary storage 106 corresponds to or includes optical storage device(s), examples of which include compact disk read-only memory (CD-ROM), digital versatile disk read-only memory (DVD-ROM), and Blu-ray disc read-only memory (BD-ROM). In at least one additional example, the secondary storage 106 corresponds to or includes, solid state storage devices, examples of which include solid state drives (SSD) and USB flash drives. Thus, the secondary storage 106 is configurable in a variety of ways that support data compression and decompression for processing in memory without departing from the spirit or scope of the described techniques.

In some scenarios, the memory 112 does not include sufficient storage to store all of the data that is utilized by the processing unit 102 as part of executing a program. Thus, the secondary storage 106 stores data in order to conserve storage in the memory 112. In one or more implementations, for instance, the processing unit 102 transfers pages from the memory 112 to the secondary storage. When a page that has been transferred to the secondary storage 106 is subsequently accessed, the processing unit 102 retrieves the page from the secondary storage 106 and stores the data of the page in the memory 112. However, transferring pages back and forth between the memory 112 and the secondary increases data transfer latency and data transfer energy, reduces data communication bandwidth, and as such, decreases overall computer performance. To overcome these performance drawbacks, the system 100 utilizes compression and decompression techniques to compress data of a page and store the compressed data within the memory 112, rather than the secondary storage 106.

Conventional techniques for data compression and data decompression, however, are implemented at the processing unit. These conventional techniques, for instance, involve communicating data that is to be compressed or decompressed from the memory 112 to the processing unit 102, compressing or decompressing the retrieved data, and communicating the compressed or decompressed data from the processing unit 102 back to the memory 112. Furthermore, many compression techniques utilize compressibility criteria that are to be satisfied in order to store compressed data in the memory 112 rather than the secondary storage 106. If the compressibility criteria are not satisfied, then the page is transferred in an uncompressed form to the secondary storage 106.

By communicating the data of the page back and forth between the memory 112 and the processing unit 102, these conventional compression and decompression techniques consume a significant amount of data communication bandwidth and data communication energy. Moreover, by implementing various compression-related tasks (e.g., compressing pages, checking compressed pages against the compressibility criteria, and decompressing compressed pages) at the processing unit 102, the processing unit 102 consumes significant computational resources. This communication bandwidth, communication energy, and computational resource consumption is often wasted on pages, which though compressed, are stored in the secondary storage 106 in an uncompressed form due to the compressibility criteria not being satisfied.

To overcome the drawbacks of conventional techniques, techniques for data compression and decompression for processing in memory are described herein to offload data compression and data decompression to the PIM component 114. In accordance with the described techniques, a compressed block device 124 is maintained in the memory 112. The compressed block device 124 is a portion of the memory 112 dedicated to storing compressed pages. In at least one example, the compressed block device 124 is a compressed cache, e.g., CompCache, ZRAM, etc.

In one or more implementations, the memory 112 also maintains an index table 126. Generally, the index table 126 is a data structure that tracks where in the compressed block device 124 compressed pages are located. As shown, the index table 126 includes a plurality of index table entries 128, each of which corresponds to a page that has been compressed and stored in the compressed block device 124. Further, each of the index table entries 128 includes a mapping 130, which maps an index table entry 128 to a compressed page address that identifies a location in the compressed block device 124 where the corresponding compressed page is maintained. Consider an example in which a page corresponding to the page table entry 118 is compressed and stored at a location 132 in the compressed block device 124. In this example, an index table entry 128 is created in the index table 126 which corresponds to the page, i.e., the page table entry 118 corresponds to the index table entry 128. Further, the mapping 130 of the index table entry 128 is updated to include a compressed page address that identifies the location 132 in the compressed block device 124.

In accordance with the described techniques, the processing unit 102 communicates compressibility criteria to the PIM component. To do so, the memory controller 110 writes the compressibility criteria to a compressibility check register 134 maintained by the PIM component 114 using a PIM-write command. The compressibility check register 134 corresponds to or includes one or more registers dedicated to storing the compressibility criteria. In some examples, the compressibility criteria specify a maximum size for a compressed page to be stored in the compressed block device 124 rather than the secondary storage 106. The compressibility criteria, for example, can be specified as a percentage (e.g., fifty percent) of the uncompressed page size, a constant (e.g., sixteen bits of data), or in any other suitable manner.

In one or more implementations, the PIM component 114 receives a page address 136 that maps to a location 122 in the memory 112 where data 138 of a page is maintained. By way of example, a page that is to be compressed is identified. The processing unit 102 communicates with the memory module 104 to translate a virtual page address to a physical page address 136 using the page table 116. For example, the processing unit 102 reads the physical page address 136 corresponding to the virtual page address from the page table entry 118 representing the page to be compressed. The processing unit 102 then communicates the page address 136 to the PIM component 114.

In accordance with the described techniques, the PIM component 114 includes compression logic 140 to implement various compression-related tasks. In at least one example, the compression logic 140 is received from the processing unit 102 as a series of PIM-load commands, a series of PIM-operate commands, and a series of PIM-store commands instructing the PIM component 114 to implement the various compression-related tasks.

As part of the compression logic 140, the PIM component 114 is configured to compress the data 138 of the page. To do so, the PIM component 114 reads the data 138 of the page from the location 122 in the memory 112 indicated by the page address 136 and stores the data 138 of the page in registers maintained by the PIM component 114, e.g., by way of one or more PIM-load commands. The PIM component 114 then compresses the data 138 of the page residing in the registers to generate compressed data 142, e.g., by way of one or more PIM-operate commands. The PIM component 114 is further configured to compare the compressed data 142 to the compressibility criteria maintained in the compressibility check register 134, e.g., by way of one or more PIM-operate commands.

In one or more implementations, the PIM component 114 also receives a compressed page address from the processing unit 102 which maps to a location 132 in the compressed block device 124 where the compressed data 142 is to be stored. If the compressed data 142 satisfies the compressibility criteria, then the PIM component 114 is configured to write the compressed data 142 to the location 132 in the compressed block device 124 indicated by the compressed page address, e.g., by way of one or more PIM-store commands.

Moreover, the PIM component 114 receives a compression result address from the processing unit 102 that maps to a dedicated location 144 in the memory 112 which is dedicated to storing a compression result 146. Generally, the compression result 146 indicates whether compression of the data 138 was successful, i.e., whether the compressed data 142 satisfies the compressibility criteria. In one example, the compression result 146 is a binary indicator, e.g., having a value of "1" if the compressed data 142 satisfies the compressibility criteria, or having a value of "0" if the compressed data 142 does not satisfy the compressibility criteria. Thus, in response to the compressed data 142 satisfying the compressibility criteria, the PIM-component 114 writes a successful compression result 146 to the dedicated location 144 in the memory 112 indicated by the compression result address, e.g., by way of one or more PIM-store commands.

The processing unit 102 is further configured to update the page table entry 118 to indicate that the data of the page is stored in the compressed block device 124. To do so, the processing unit 102 reads the successful compression result 146 from the dedicated location 144 in the memory 112 which indicates that the data 138 of the page is now stored in a compressed form in the compressed block device 124. Upon reading the successful compression result, the processing unit 102 updates a compressibility bit of the page table entry 118 to indicate that the data 138 of the page is not stored in the main memory 112, but rather is stored in the compressed block device 124 in a compressed form. The compressibility bit, for instance, is a binary indicator included as part of the page table entry 118 which indicates whether the corresponding page is stored in the compressed block device 124, e.g., having a value of "0" if the corresponding page is stored in the main memory 112, or having a value of "1" if the corresponding page is stored in the compressed block device 124.

The processing unit 102 is further configured to update an index table entry 128 corresponding to the page table entry 118 to indicate that the data 138 of the page maps to the location 132 in the compressed block device 124. To do so, the processing unit 102 reads the compression result 146 from the dedicated location 144 in the memory 112 that indicates that the data 138 of the page is now stored in a compressed form in the compressed block device 124. Upon reading the successful compression result 146, the processing unit 102 updates the index table entry 128 to include the mapping 130. In particular, the processing unit 102 updates the index table entry 128 to include the compressed page address which maps to the location 132 in the compressed block device 124 where the compressed data 142 is located.

Additionally or alternatively, the PIM component 114 is configured to update the index table entry 128 as part of the compression logic 140. To do so, the PIM component 114 initially receives an index table address which maps to a location in the index table 126 where the index table entry 128 is located. As noted earlier, the PIM component 114 also receives a compressed page address from the processing unit 102 which maps to the location 132 in the compressed block device 124 where the compressed data 142 is to be stored. Upon writing the compressed data 142 to the location 132 in the compressed block device 124 indicated by the compressed page address, the PIM component 114 is further configured to write the compressed page address to the location in the index table indicated by the index table address, e.g., by way of one or more PIM-store commands.

In various scenarios, the compressed data 142 does not satisfy the compressibility criteria. In accordance with these scenarios, the PIM component 114 is configured to write the data 138 of the page back to the location 122 in the memory 112 where the data 138 of the page was originally maintained, e.g., by way of one or more PIM-store commands. Further, the PIM component 114 writes an unsuccessful compression result 146 to the dedicated location 144 in the memory 112, e.g., by way of one or more PIM-store commands. The unsuccessful compression result 146 indicates that the compressed data 142 does not satisfy the compressibility criteria and the data 138 of the page is stored in an uncompressed form at the location 122 in the memory 112.

In accordance with these scenarios, the processing unit 102 transfers the data 138 of the page in the uncompressed form to the secondary storage 106. To do so, the processing unit 102 reads the unsuccessful compression result 146 from the dedicated location 144 in the memory 112 which indicates that the data 138 of the page is maintained at the location 122 in the memory 112. Upon reading the unsuccessful compression result 146, the processing unit 102 reads the uncompressed data of the page from the first location 122 and transfers the uncompressed data of the page to the secondary storage 106. In at least one variation, the PIM component 114 maintains the uncompressed data of the page in registers responsive to the compressibility criteria not being met, e.g., rather than writing the uncompressed data of the page to the first location 122. In accordance with this variation, the processing unit 102 reads the uncompressed data of the page directly from the registers (e.g., via a PIM-read command) to initiate transferring the uncompressed data 138 of the page to the secondary storage 106.

In one or more implementations, multiple PIM components 114 are embedded in the memory module 104. Further, the multiple PIM components 114 correspond to or include single instruction, multiple data (SIMD) in-memory processors configured to execute the PIM commands in a SIMD instruction format. In accordance with SIMD processing, multiple PIM components 114 are each configured to execute a single instruction (e.g., a PIM-load command, a PIM-operate command, a PIM-store command) concurrently, but each PIM component 114 executes the single instruction on different data. Notably, PIM components 114 often have a limited amount of temporary storage in registers.

Consider an example in which the registers of each of the multiple PIM components 114 store a maximum of sixteen bits of data, and a page is identified for compression that is thirty-two bits of data. In accordance with this example, two PIM components are each configured to implement the above-described compression logic 140 on different data and in parallel. By way of example, a series of PIM-load commands instruct a first PIM component to load the first sixteen bits of data into the registers of the first PIM component concurrently while a second PIM component loads the second sixteen bits of data into the registers of the second PIM component. Furthermore, a series of PIM-operate commands instruct the first PIM component to compress the first sixteen bits of data residing in the registers of the first PIM component concurrently while the second PIM component compresses the second sixteen bits of data residing in the registers of the second PIM component. Moreover, a series of PIM-store commands instruct the first PIM component to store a first portion of the compressed data 142 at the location 132 in the compressed block device 124 concurrently while the second PIM component stores a second portion of the compressed data 142 at the location 132 in the compressed block device 124.

Notably, by implementing the compression logic 140 in a SIMD manner, the multiple PIM components 114 can perform the various compression-related tasks on multiple data elements concurrently using a single instruction. By doing so, the system 100 is able to process the data faster than conventional techniques, while communicating fewer commands, thus increasing data communication bandwidth, and increasing overall computer performance.

In one or more implementations, the memory 112 is organized into a plurality of memory channels, each of which includes a portion of the memory 112 and one or more PIM components 114. Notably, each memory channel provides a communication link between the memory 112 and the processing unit 102. In one or more implementations, each respective PIM component 114 is configured to access a portion of the memory 112 that is included in a same memory channel as the respective PIM component 114, e.g., to read and write to the portion of the memory 112. However, each respective PIM component does not access portions of the memory 112 that are included in different memory channels.

Given this, consider an example in which a page is identified for compression that spans across multiple memory channels in the memory 112. In this example, for instance, the data 138 of the page includes a first portion of the data 138 that is stored in a section of the memory 112 mapped to a first memory channel. Additionally, the data 138 of the page includes a second portion of the data 138 that is stored in a section of the memory 112 mapped to a second memory channel. In accordance with this example, a first PIM component (or set of PIM components) included in the first memory channel is configured to compress the first portion of the data 138 of the page that is also included in the first memory channel. Furthermore, a second PIM component (or set of PIM components) included in the second memory channel is configured to compress the second portion of the data 138 of the page that is also included in the second memory channel. In at least one implementation, the first PIM component compresses the first portion of the data 138 concurrently while the second PIM component compresses the second portion of the data 138.

Notably, the portion of the page included in each channel is compressed separately. This contrasts with conventional techniques that implement compression logic at the processing unit 102. Due to this, it is possible for the first PIM component to generate a first portion of the compressed data 142 that is a different size than a second portion of the compressed data 142 generated by the second PIM component. Furthermore, data compression implemented separately by PIM components included in different memory channels can achieve a different compression ratio than compression implemented by the processing unit 102 despite using a same compression algorithm.

In one or more variations, the compressed block device 124 is spread across the plurality of memory channels, such that each memory channel includes a portion of the compressed block device 124. Continuing with the previous example, the first PIM component is configured to write the first portion of the compressed data 142 to a first portion of the compressed block device 124 that is also included in the first memory channel. Further, the second PIM component is configured to write the second portion of the compressed data 142 to a second portion of the compressed block device 124 that is also included in the second memory channel. In some implementations, the first PIM component writes the first portion of the compressed data 142 to the first portion of the compressed block device 124 concurrently while the second PIM component writes the second portion of the compressed data 142 to the second portion of the compressed block device 124.

Since the separately compressed portions of the compressed data 142 can have different sizes and are stored separately in different memory channels, the starting address for subsequent compressed pages can differ. Consider an example in which the first portion of the compressed data 142 is three data elements, and the second portion of the compressed data 142 is two data elements. Due to this, the starting address for a subsequent compressed page in the compressed block device 124 of the first memory channel is a fourth position, while the starting address for a subsequent compressed page in the compressed block device 124 of the second memory channel is a third position. Therefore, the processing unit 102 is configured to track and maintain starting addresses in the compressed block device 124 per memory channel. In this way, the PIM-store commands instruct the PIM components to write the compressed data 142 to the correct location 132 in the compressed block device 124, e.g., to a fourth position in the compressed block device 124 for a subsequent compressed page of the first memory channel, and to a third position in the compressed block device 124 for a subsequent compressed page of the second memory channel.

Figure 2:
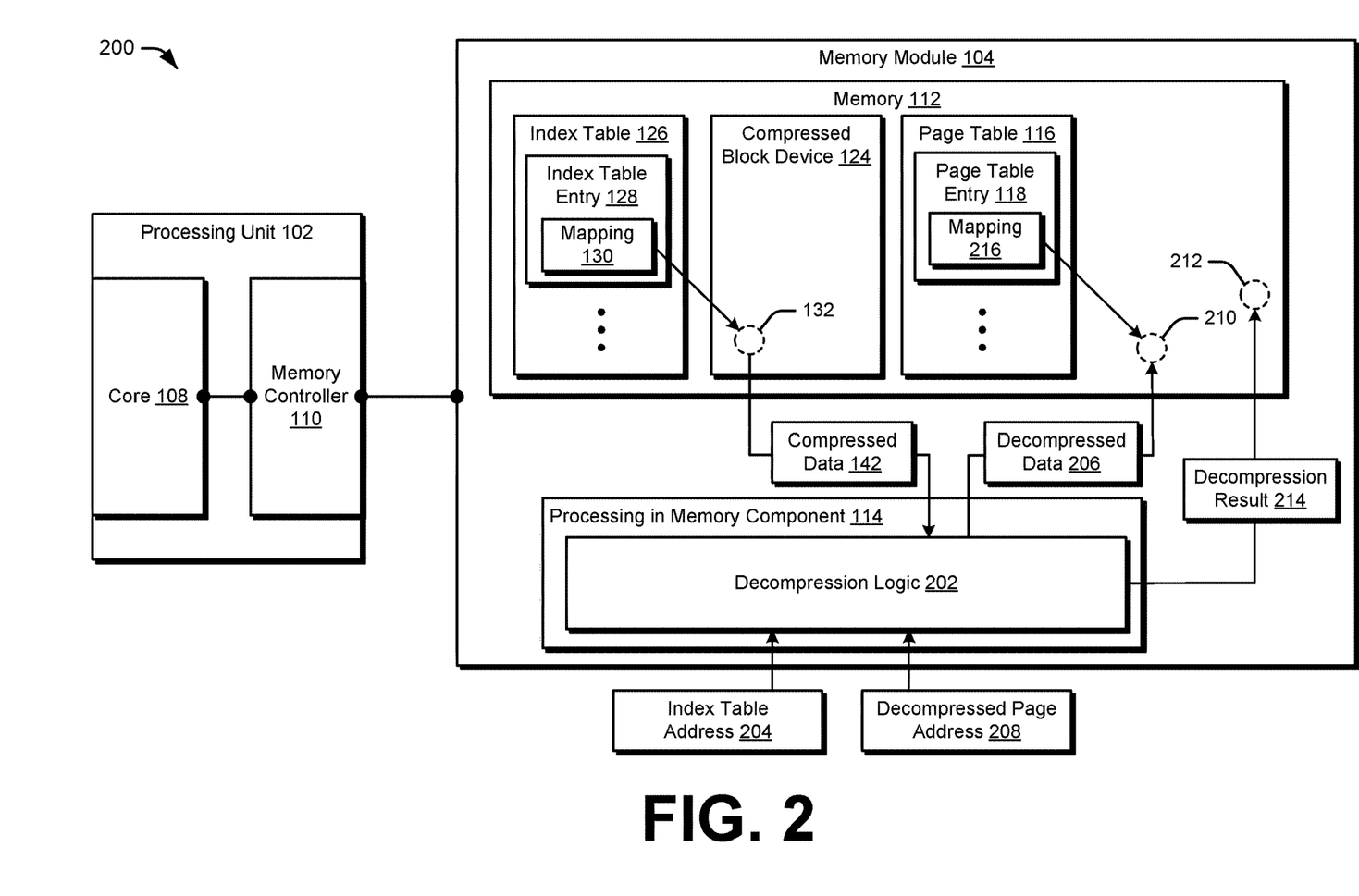
FIG. 2 depicts a non-limiting example in which the processing in memory component implements data decompression in accordance with the described techniques.

FIG. 2 depicts a non-limiting example 200 in which the processing in memory component implements data decompression in accordance with the described techniques. Example 200 includes the processing unit 102 and the memory module 104. The processing unit 102 includes the core 108 and the memory controller 110. The memory module 104 includes the memory 112 and the PIM component 114. Further, the memory 112 includes the page table 116, the compressed block device 124, and the index table 126. The PIM component 114 includes decompression logic 202 to implement various decompression-related tasks.

In accordance with the described techniques, the PIM component 114 receives an index table address 204 that maps to the location 132 in the compressed block device 124 where the compressed data 142 is maintained. By way of example, a page corresponding to the page table entry 118 is accessed after the data of the page has been compressed and the compressed data 142 of the page has been stored in the compressed block device 124. The processing unit 102 reads the compressibility bit in the page table entry 118 which has been set (e.g., to a value of "1") to indicate that the data of the page is stored in the compressed block device 124 in a compressed form. Upon determining that the compressed page is stored in the compressed block device 124, the processing unit 102 communicates the index table address 204 to the PIM component 114. The index table address 204 identifies a location in the index table 126 where the index table entry 128 corresponding to the page is located. Notably, the index table entry 128 includes the mapping 130 which corresponds to or includes the compressed page address that maps to the location 132 in the compressed block device 124 where the compressed data 142 of the page is located. Using the index table address 204 received from the processing unit 102, the PIM component 114 is configured to read the compressed page address from the index table entry 128 to determine the location of the compressed data 142 of the page.

In one or more implementations, the decompression logic 202 is received from the processing unit 102 as a series of PIM-load commands, a series of PIM-operate commands, and a series of PIM-store commands instructing the PIM component 114 to implement various decompression-related tasks. As part of the decompression logic 202, the PIM component 114 is configured to decompress the compressed data 142 of the page. To do so, the PIM component 114 reads the compressed data 142 of the page from the location 132 in the compressed block device 124 indicated by the index table address 204 and stores the compressed data 142 in registers maintained by the PIM component, e.g., by way of one or more PIM-load commands. Next, the PIM component 114 decompresses the data of the page residing in the registers to generate decompressed data 206, e.g., by way of one or more PIM-operate commands.

The PIM component 114 is further configured to receive a decompressed page address 208 from the processing unit 102 which maps to a location 210 in the memory where the decompressed data 206 is to be stored. Upon decompressing the compressed data 142, the PIM component is configured to write the decompressed data 206 to the location 210 in the memory 112 indicated by the decompressed page address 208, e.g., by way of one or more PIM-write commands. In some examples, the location 210 is a different location than the location 122 where the data 138 of the page was originally stored.

Additionally or alternatively, the PIM component 114 receives a decompression result address from the processing unit that maps to a dedicated location 212 in the memory 112 which is dedicated to storing a decompression result 214. In variations, the dedicated location 212 for storing the decompression result is the same as the dedicated location 144 for storing the compression result 146. In one example, the decompression result 214 is a binary indicator, e.g., having a value of "1" if the compressed data 142 was successfully decompressed, or having a value of "0" if the compressed data 142 was not successfully decompressed. Thus, in response to the compressed data 142 being successfully decompressed and the decompressed data 206 being stored at the location 210 in the memory 112, the PIM component is configured to write a successful decompression result to the dedicated location 212 in the memory 112 indicated by the decompression result address, e.g., by way of one or more PIM-store commands. The successful decompression result 214 indicates that the compressed data 142 of the page was successfully decompressed and the decompressed data 206 of the page is maintained in the memory 112 at the location 210.

The processing unit 102 is configured to update the page table entry 118 corresponding to the page to indicate that the data of the page maps to the location 210 in the memory 112 where the decompressed data 206 is stored. To do so, the processing unit 102 reads the successful decompression result 214 from the dedicated location 212 in the memory 112 which indicates that the data of the page is now stored in the main memory 112 in a decompressed form. Upon reading the successful decompression result 214, the processing unit 102 updates the page table entry 118 to include an updated mapping 216. In particular, the processing unit 102 updates the page table entry 118 to include the decompressed page address 208 which maps to the location 210 in the memory where the decompressed data 206 is located. In at least one variation, the PIM component 114 is configured to update the mapping 216 of the page table entry 118 to include the decompressed page address 208, e.g., by way of a series of PIM-store commands.

Upon reading the decompression result 214 that indicates that the compressed data 142 of the page is no longer stored in the compressed block device 124, the processing unit 102 is further configured to update the compressibility bit of the page table entry 118 to indicate that the data of the page is no longer stored in the compressed block device 124. By way of example, the processing unit 102 changes the compressibility bit to have a value of "0" to indicate that the corresponding data of the page is stored in the main memory 112, and not the compressed block device 124.

By implementing the compression logic 140 and the decompression logic 202 at the PIM component 114, the described techniques improve computer performance over conventional techniques which communicate data from the memory 112 to the processing unit, compress or decompress the data, and communicating the compressed data or decompressed data from the processing unit 102 back to the memory 112. This is, in part, because the communication pathway between the memory 112 and the PIM component 114 is shorter than the communication pathway between the memory 112 and the processing unit 102. As a result, the described techniques reduce data movement, thereby reducing data transfer latency and data transfer energy, while increasing data communication bandwidth on the communication pathway(s) between the memory 112 and the processing unit 102. Moreover, by utilizing the PIM component 114 to compress data, check compressibility criteria, and decompress data, the described techniques conserve computational resource usage at the processing unit 102, thereby improving performance for the processing unit 102.

In one or more implementations, the processing unit 102 is configured to deterministically offload data compression and data decompression to the PIM component 114. In one example, the processing unit 102 offloads the compression logic 140 and the decompression logic 202 to the PIM component 114 if a source address maps to a same memory channel as a destination address. In the case of compression, the page address 136 identifying where the data of the page is located is the source address, and the compressed page address identifying where the compressed data 142 of the page is to be written is the destination address. Thus, if the location 122 indicated by the page address 136 is included in a same memory channel as the location 132 indicated by the compressed page address, then the processing unit 102 offloads the compression logic 140 to the PIM component. If, however, the page address 136 and the compressed page address are mapped to different memory channels, then the processing unit 102 implements the compression logic 140 at the core 108 of the processing unit 102, e.g., by reading the data of the page from the memory 112, compressing the data 138 of the page, and writing the data of the page to the compressed block device 124.

In the case of decompression, the compressed page address identifying where the compressed data 142 is stored is the source address, and the decompressed page address 208 where the decompressed data 206 is to be written is the destination address. Thus, if the location 132 indicated by the compressed page address is included in a same memory channel as the location 210 indicated by the decompressed page address 208, then the processing unit 102 offloads the decompression logic 202 to the PIM component 114. If, however, the compressed page address and the decompressed page address 208 are mapped to different memory channels, then the processing unit 102 implements the decompression logic 202 at the core 108 of the processing unit 102, e.g., by reading the compressed data 142 from the compressed block device 124, decompressing the compressed data 142, and writing the decompressed data 206 to the memory 112.

In another example, the processing unit 102 offloads the compression logic 140 and/or decompression logic 202 based on whether the data to be compressed or decompressed spans across multiple memory channels. In one scenario, for example, a page that is maintained in memory across two different memory channels is identified for compression. In such a scenario, the PIM components 114 are configured to compress different portions of the data of the page separately, and as a result, the compression ratio achieved through PIM-based compression can be different than compression implemented by the processing unit 102, e.g., the data compressed by the PIM component 114 is larger than the data compressed by the processing unit 102. Therefore, the processing unit 102, in some implementations, is configured to offload the compression logic 140 to the PIM component 114 responsive to the data of the page being maintained in only one memory channel. In contrast, the processing unit, in some implementations, is configured to implement the compression logic 140 to the PIM component 114 in response to the data of the page being maintained in multiple memory channels.

Example PIM-Based Compression and Decompression Algorithms

In one or more examples, the PIM component 114 compresses the data 138 of the page using a Lempel-Ziv-Welch (LZW) compression algorithm and decompresses the compressed data 142 of the page using an LZW decompression algorithm Although the following example is discussed with reference to LZW compression and LZW decompression, it is to be appreciated that the described techniques are implementable using any suitable compression/decompression algorithms, examples of which include Lempel-Ziv (LZ), Run-Length Encoding (RLE), and ZLIB.

LZW compression utilizes a code table (e.g., maintained in the memory 112) containing entries which map strings of characters to codes. The codes generally take up less space than the corresponding strings of characters. In some implementations, the code table is pre-populated with codes for eight-bit ASCII characters (e.g., code <65> for character 'A'). Broadly, LZW compression iteratively evaluates character strings in the data 138 being compressed and replaces the character strings with matching codes in the code table. If a string of characters has a matching code in the code table, then the next iterative character is appended to the character string, and the updated character string is evaluated in a next iteration. If a string of characters being evaluated does not have a matching code in the code table, then the code obtained in a previous iteration is output as the code for the previously evaluated string of characters, and the code table is updated to include a code for the string of characters being evaluated in the current iteration.

To demonstrate PIM-based LZW compression, consider an example in which a sixteen-bit page of data "ABCDEFGHIJKLMNOP" is to be compressed by two PIM components 114 implemented as SIMD in-memory processors each storing a maximum of eight bits of data in their respective registers. Continuing with the previous example, a first PIM component 114 loads the first eight bits of data "ABCDEFGH" into registers. The first PIM component 114 then compares the first bit of data "A" to the code table, finds a code matching the character "A." Next, the first PIM component 114 compares the string of characters "AB" to the code table, and finds a code matching the string "AB." Further, the first PIM component compares the string of characters "ABC" to the code table but does not find a code matching "ABC." Thus, the PIM component 114 outputs the code from the previous iteration (e.g., the code <267> matching the string "AB") as the first element of the compressed data 142 and creates an entry in the code table for the string "ABC." Then, the first PIM component 114 repeats the process starting with the third bit of data "C." In the example scenario, for instance, the PIM component 114 outputs a code <312> matching a subsequent string of characters "CD" as a second element of the compressed data 142 in a similar manner to that discussed above, and so on.

As noted earlier, the PIM components 114 are configured to execute the PIM-commands received from the processing unit 102 in a SIMD manner, e.g., by executing the same set of PIM-commands but on different data. Thus, the second PIM component is configured to load the second eight bits of data "IJKLMNOP" into registers and compress the data 138 of the page (e.g., "IJKLMNOP") using LZW compression, as described above, and in parallel with the first PIM component. If the data 138 of the page has more data elements than storage space available in registers of the PIM components (e.g., the data 138 of the page is longer than sixteen bits), then the data can be compressed over multiple iterations.

Similar to LZW compression, LZW decompression utilizes a code table (e.g., maintained in the memory 112) that is pre-populated with codes for eight-bit ASCII characters. In one or more implementations, the code table utilized for LZW decompression is a different code table than that built during LZW compression. In general, LZW decompression receives a string of codes as input, compares the codes to the code table to identify matching strings of characters, and adds entries to the code table with each comparison.

To demonstrate LZW decompression, consider an example in which the compressed data 142 is to be decompressed utilizing two PIM components 114. Initially, the first PIM component 114 loads the compressed data 142 comprising a string of codes into registers. The first PIM component 114 then finds a matching string of characters in the code table for the first code and translates the first code into the string of characters obtained from the code table, e.g., the first PIM component 114 translates the code <267> to string of characters "AB." Upon obtaining the translation, the first PIM component 114 outputs the translated string of characters to the second PIM component 114, which maintains the decompressed data 206 in registers.

The first PIM component 114 then compares the second code in the string of codes to the code table. If a matching string of characters is not found in the string table, then the first PIM component 114 obtains, as the translation to the second code, the string of characters translated in the previous iteration (e.g., "AB") having the first character in the string of characters appended (e.g., "ABA"). Then, the first PIM component 114 adds the translated string of characters (e.g., "ABA") as a new entry in the code table, and outputs the translated string of characters to the second PIM component 114.

If, however, a matching string of characters is found in the string table, then the first PIM component 114 translates the second code into the string of characters obtained from the code table, e.g., the first PIM component 114 translates code <312> to string of character "CD." The first PIM component 114 then outputs the translated string of characters (e.g., "CD") to the second PIM component 114. Further, the first PIM component 114 generates, as a new code table entry, the string of characters translated in the previous iteration (e.g., "AB") having the first character from the string of characters translated in the current iteration appended (e.g., "ABC"). This process is then iteratively repeated for each code in the string of codes.

Figure 3:
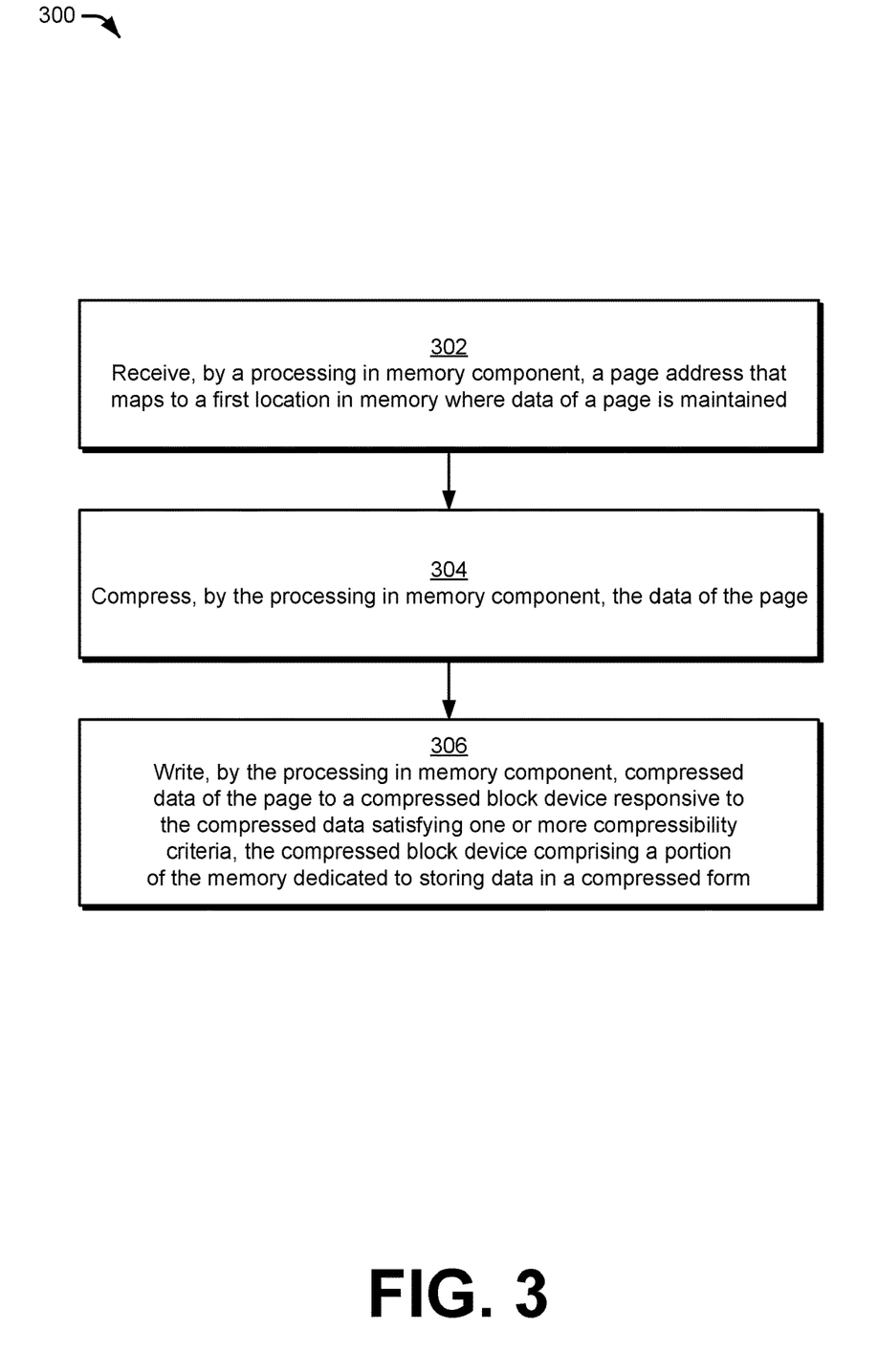
FIG. 3 depicts a procedure in an example implementation of PIM-based data compression in accordance with the described techniques.

FIG. 3 depicts a procedure 300 in an example implementation of PIM-based data compression in accordance with the described techniques.

A page address is received by a processing in memory component that maps to a first location in memory where data of a page is maintained (block 302). By way of example, the PIM component 114 receives the page address 136 which maps to the location 122 in the memory 112 where the data 138 of the page is maintained.

The data of the page is compressed by the processing in memory component (block 304). By way of example, the compression logic 140 includes a series of PIM-load commands and a series of PIM-operate commands (e.g., received from the processing unit 102) instructing the PIM component 114 to compress the data 138 of the page. The PIM-load commands instruct the PIM component 114 to read the data 138 of the page from the location 122 in the memory 112 indicated by the page address 136 and load the data 138 into registers of the PIM component 114. The PIM-operate commands instruct the PIM component 114 to compress the data 138 (e.g., using LZW compression) residing in the registers to generate the compressed data 142. Further, the PIM-operate commands instruct the PIM component 114 to compare the compressed data 142 to the compressibility criteria maintained in the compressibility check register 134 of the PIM component 114.

The compressed data of the page is written to a compressed block device by the processing in memory component responsive to the compressed data of the page satisfying one or more compressibility criteria, the compressed block device comprising a portion of the memory dedicated to storing data in a compressed form (block 306). By way of example, the PIM component 114 receives a compressed page address from the processing unit 102 identifying a location 132 in the compressed block device 124 where the compressed data 142 is to be written. The compression logic 140 also includes a series of PIM-store commands instructing the PIM component 114 to write the compressed data 142 to the location 132 in the compressed block device 124 responsive to the compressed data 142 satisfying the compressibility criteria. If the compressed data 142 does not satisfy the compressibility criteria, then the uncompressed data 138 of the page is written back to the location 122 in the memory 112, and transferred, by the processing unit 102, from the memory 112 to secondary storage 106.

Figure 4:
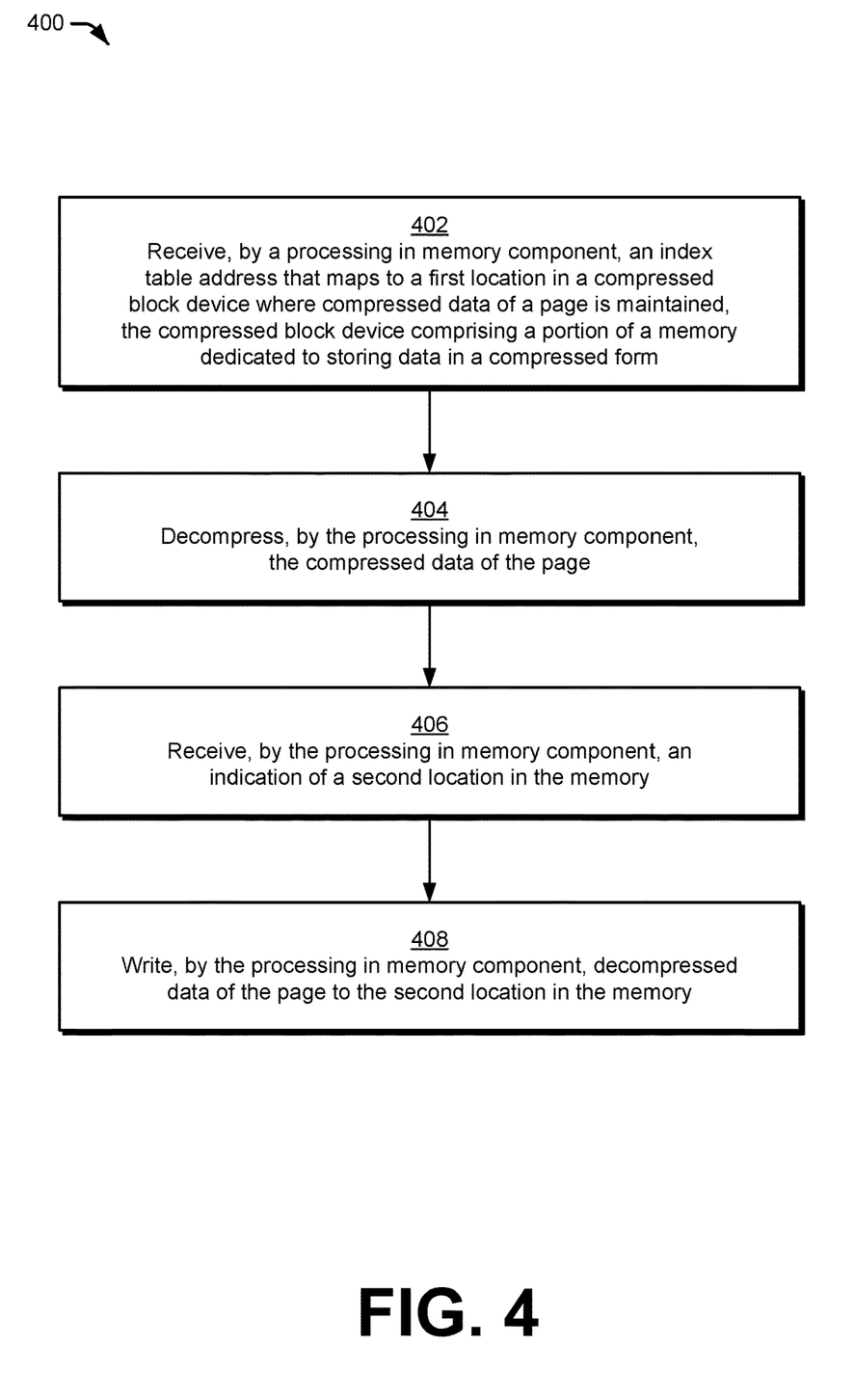
FIG. 4 depicts a procedure in an example implementation of PIM-based data decompression in accordance with the described techniques.

FIG. 4 depicts a procedure 400 in an example implementation of PIM-based data decompression in accordance with the described techniques.

An index table is received by a processing in memory component that maps to a first location in a compressed block device where compressed data of a page is maintained, the compressed block device comprising a portion of a memory dedicated to storing data in a compressed form (block 402). By way of example, the PIM component 114 receives the index table address 204 (e.g., from the processing unit 102) which identifies a location in the index table 126 corresponding to the index table entry 128. Notably, the index table entry 128 includes the mapping 130 which corresponds to or includes the compressed page address that maps to the location 132 in the compressed block device 124 where the compressed data 142 of the page is located. The compressed page address included in the index table entry 128 is read by the PIM component 114 to identify the location 132 of the compressed page.

The compressed data of the page is decompressed by the processing in memory component (block 404). By way of example, the decompression logic 202 includes a series of PIM-load and a series of PIM-operate commands (e.g., received from the processing unit 102) instructing the PIM component 114 to decompress the compressed data 142. The PIM-load commands instruct the PIM component to read the compressed data 142 from the location 132 in the memory indicated by the index table address 204 and load the compressed data 142 into registers of the PIM component 114. The PIM-operate commands instruct the PIM component 114 to decompress the compressed data 142 (e.g., using LZW decompression) residing in the registers to generate the decompressed data 206.

An indication of a second location in the memory is received by the processing in memory component (block 406). By way of example, the PIM component 114 receives the decompressed page address 208 from the processing unit 102. The decompressed page address identifies a location 210 in the memory 112 where the decompressed data 206 of the page is to be written.

Decompressed data of the page is written to the second location in the memory by the processing in memory component (block 408). By way of example, the decompression logic 202 also includes a series of PIM-store commands instructing the PIM component 114 to write the decompressed data 206 to the location 210 in the memory 112 indicated by the decompressed page address 208.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the processing unit 102, the memory module 104, the secondary storage 106, the core 108, the memory controller 110, the memory 112, and the PIM component 114) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
    receiving, by a processing-in-memory circuit, a page address that maps to a first location in memory where uncompressed data of a page is maintained;
    compressing, by the processing-in-memory circuit, the uncompressed data of the page to generate compressed data of the page; and
    writing, by the processing-in-memory circuit and responsive to the compressed data of the page satisfying one or more compressibility criteria:
        the compressed data of the page to a portion of the memory dedicated to storing data in a compressed form, and
        a compression result to a dedicated location in the memory, the compression result causing a processor communicatively coupled to the memory to update an entry in a page table maintained in the memory to indicate that the compressed data of the page is stored in the portion of the memory.

2. The method of claim 1, wherein writing the compression result causes the processor to update an additional entry corresponding to the page in an index table maintained in the memory to indicate that the data of the page maps to a second location in the portion of the memory where the compressed data of the page is maintained.

3. The method of claim 1, further comprising writing, by the processing-in-memory circuit and to the dedicated location in the memory, a different compression result responsive to the compressed data of the page not satisfying the one or more compressibility criteria, the different compression result indicating that the compressed data of the page does not satisfy the one or more compressibility criteria and the uncompressed data of the page is stored at the first location in the memory.

4. The method of claim 3, wherein writing the different compression result causes the processor to transfer the uncompressed data of the page to a secondary storage device.

5. The method of claim 1, wherein the compressing the uncompressed data of the page is performed by multiple processing-in-memory circuits configured as single instruction, multiple data (SIMD) in-memory processors, each of the multiple processing-in-memory circuits compressing a portion of the uncompressed data of the page in parallel.

6. The method of claim 1, wherein:
the processing-in-memory circuit is included in a first memory channel and a first portion of the uncompressed data of the page is mapped to a location in the memory that is also included in the first memory channel, the compressing including compressing, by the processing-in-memory circuit, the first portion of the uncompressed data of the page, and
an additional processing-in-memory circuit is included in a second memory channel and a second portion of the uncompressed data of the page is mapped to a location in the memory that is also included in the second memory channel, the compressing including compressing, by the additional processing-in-memory circuit, the second portion of the uncompressed data of the page.

7. The method of claim 6, wherein the writing the compressed data of the page includes:
writing, by the processing-in-memory circuit, a first compressed portion of the data to a first section of the portion of the memory included in the first memory channel, and
writing, by the additional processing-in-memory circuit, a second compressed portion of the data of the page to a second section of the portion of the memory included in the second memory channel.

8. The method of claim 1, wherein the portion of the memory only stores the data in the compressed form.

9. The method of claim 1, wherein the compression result indicates that the compressed data of the page satisfies the one or more compressibility criteria and is stored in the portion of the memory.

10. A method comprising:
receiving, by a processing-in-memory circuit, an index table address that maps to a first location in a portion of memory where compressed data of a page is maintained, the portion of the memory dedicated to storing data in a compressed form;
decompressing, by the processing-in-memory circuit, the compressed data of the page;
receiving, by the processing-in-memory circuit, an indication of a second location in the memory; and
writing, by the processing-in-memory circuit, decompressed data of the page to the second location in the memory and a decompression result to a dedicated location in the memory, the decompression result indicating that the compressed data was successfully decompressed and the decompressed data of the page is maintained in the memory at the second location.

11. The method of claim 10, wherein writing the decompression result causes a processor communicatively coupled to the memory to update an entry in a page table maintained in the memory to indicate that the decompressed data of the page maps to the second location in the memory where the decompressed data of the page is stored.

12. A system comprising:
a memory;
a portion of the memory dedicated to storing data in a compressed form;
a processing-in-memory circuit; and
a processor communicatively coupled to the memory, the processor configured to:
communicate commands to the memory, the commands including a page address which maps to a first location in the memory where uncompressed data of a page is maintained, the commands instructing the processing-in-memory circuit to compress the uncompressed data of the page to generate compressed data of the page and write, based on the compressed data of the page satisfying one or more compressibility criteria, the compressed data to a second location in the portion of the memory, compression of the uncompressed data of the page being offloaded via the commands based on the first location and the second location being included in a same memory channel; and
compress the uncompressed data of the page based on the first location and the second location being included in different memory channels.

13. The system of claim 12, wherein the commands instruct the processing-in-memory circuit to write a compression result to a dedicated location in the memory, the compression result indicating that the compressed data of the page satisfies the one or more compressibility criteria and is stored in the portion of the memory.

14. The system of claim 13, wherein the processor is further configured to:
read the compression result; and
update an entry corresponding to the page in an index table maintained in the memory, the entry updated to indicate that the compressed data of the page maps to the second location in the portion of the memory where the compressed data of the page is maintained.

15. The system of claim 12, wherein the processor is further configured to communicate additional commands to the memory, the additional commands including an index table address of the page which maps to the second location in the portion of the memory where the compressed data of the page is maintained and an address which identifies a third location in the memory, the additional commands instructing the processing-in-memory circuit to decompress the compressed data to generate decompressed data and write the decompressed data to the third location in the memory.

16. The system of claim 15, wherein the additional commands instruct the processing-in-memory circuit to write a decompression result to a dedicated location in memory, the decompression result indicating that the compressed data of the page was successfully decompressed and the decompressed data of the page is maintained in the memory at the third location.

17. The system of claim 16, wherein the processor is further configured to:
read the decompression result; and
update an entry in a page table maintained in the memory to indicate that the page address maps to the third location in the memory where the decompressed data of the page is stored.

18. The system of claim 15, wherein the processor is further configured to:
- offload decompression of the compressed data of the page to the processing-in-memory circuit via the additional commands in response to the second location and the third location being included in a same memory channel; and
- decompress the compressed data of the page in response to the second location and the third location being included in different memory channels.

19. The system of claim 15, wherein the additional commands further instruct the processing-in-memory circuit to update an entry in a page table maintained in the memory to indicate that the page address maps to the third location in the memory where the decompressed data of the page is stored.

20. The system of claim 12, wherein the commands further instruct the processing-in-memory circuit to update an entry in a page table maintained in the memory to indicate that the page address maps to the second location in the portion of the memory where the compressed data is stored.

* * * * *